W. H. GROVERMAN.
AUTOMOBILE BED.
APPLICATION FILED AUG. 3, 1916.

1,255,307.  Patented Feb. 5, 1918.

WITNESSES
M. R. McInnis
E. A. Paul

INVENTOR
WILLIAM H. GROVERMAN
BY Paul & Paul
ATTORNEYS

UNITED STATES PATENT OFFICE.

WILLIAM H. GROVERMAN, OF MINNEAPOLIS, MINNESOTA.

AUTOMOBILE-BED.

1,255,307.   Specification of Letters Patent.   Patented Feb. 5, 1918.

Application filed August 3, 1916. Serial No. 112,937.

*To all whom it may concern:*

Be it known that I, WILLIAM H. GROVERMAN, a citizen of the United States, resident of Minneapolis, county of Hennepin, State of Minnesota, have invented certain new and useful Improvements in Automobile-Beds, of which the following is a specification.

The object of my invention is to provide a bed which can be placed over the front and rear seats of a car, resting upon the backs thereof and when not in use can be folded into compact form and carried on the running board or any other suitable place in the car.

A further object is to provide a bed which will be roomy and comfortable and will be thoroughly protected by the car top from the weather.

A further object is to provide a bed having a frame, with means for readily securing it to the car and so braced and supported that it will be thoroughly substantial and at the same time will not mar or damage the upholstery of the car seats.

My invention consists generally in various constructions and combinations, all as hereinafter described and particularly pointed out in the claims.

In the accompanying drawings forming part of this specification,

Figure 1:
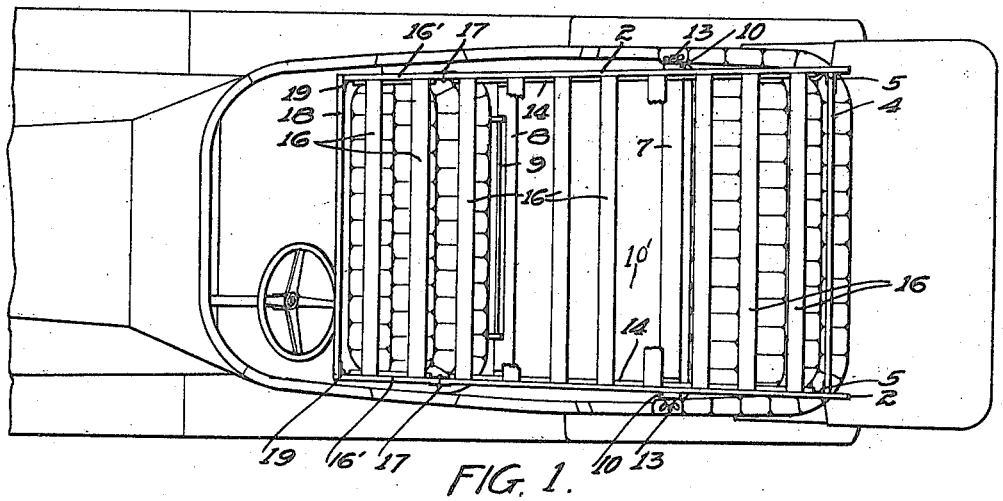
Figure 1 is a plan view of a car showing my improved bed frame mounted on the slats thereof.
Figure 2:
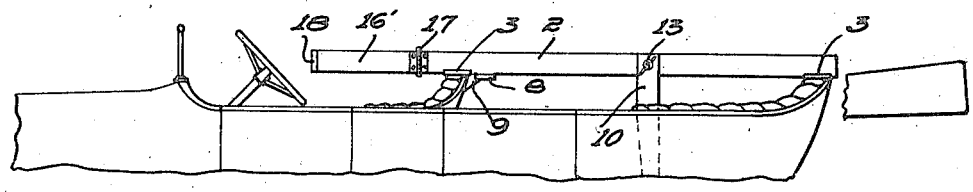
Fig. 2 is a side view of same.
Figure 3:
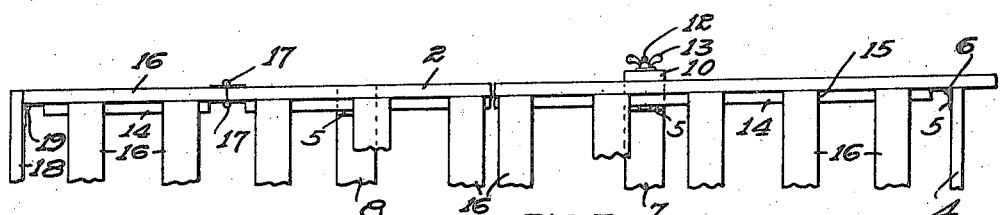
Fig. 3 is a plan view of one side of the frame.
Figure 4:
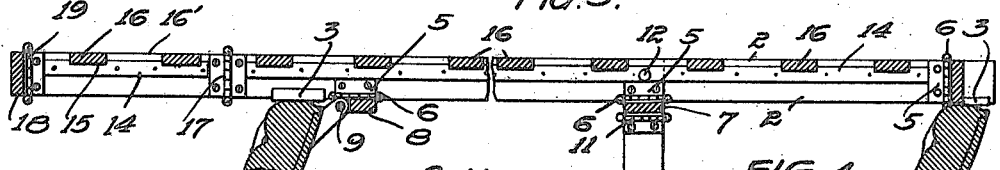
Fig. 4 is a longitudinal sectional view of the same.
Figure 5:
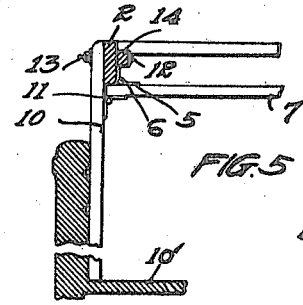
Fig. 5 is a cross section taken at right angles to Fig. 4.

In the drawing, 2 represents the rails of the bed, made of wood or metal, as preferred, and having cushions 3 at the front and rear, which are adapted to rest upon the backs of the front and rear seats. These cushions may be made of rubber or any other material which will prevent the rails of the bed from wearing or chafing the upholstering of the car. At the rear end of the rails is a cross bar 4 and hinges 5 at the ends of the bar having pins 6 connecting it with the side rails. Similar bars 7 and 8 are provided at intervals between the side rails and have their ends connected in a similar manner with said rails. The pins of the cross bars may be removable to take the bed apart and permit it to be folded into a compact form.

The forward edge of the bar 8 is cut out to straddle the robe rack or rail 9 and be held thereby against sidewise movement. At a point opposite, preferably, the cross bar 7 I provide legs 10 hinged at 11 to the cross bar 7 and secured to the rails 2 by bolts 12 passing therethrough having wing nuts 13. When these bolts and nuts are removed, the legs may be swung inwardly against one another for packing and shipping or for storage on the car. When these legs are swung outwardly to a vertical position and secured by the bolts and wing nuts, they will form rigid supports for the middle portions of the bed rails, the lower ends of the legs resting upon the floor 10' of the tonneau.

The side rails are preferably provided on their inner faces with bars 14 running lengthwise thereof, having notches 15 therein into which the ends of the bed slats 16 are inserted, as usual in bed construction. At the forward end of the rails I prefer to provide extensions 16' hinged at 17 to the rails proper and having a cross bar 18 between their forward ends, hinged at 19 thereto. This extension of the bed overhangs the front seat and is spaced therefrom and forms the foot of the bed, supporting the feet of the occupants, slats being provided between the extensions 16' for supporting the mattress on a level substantially with the forward portion of the mattress. As this part of the bed frame has comparatively little pressure thereon when the bed is in use, I have found it unnecessary to provide any brace or leg beneath it, it being sufficient to connect both the inner and outer faces of these extensions with the abutting ends of the rails 2. The pins of these hinges are removable, so that the rails 16' and 18 can be taken apart and stored or packed away in the car with the other parts of the bed.

This apparatus can be easily and quickly set up within the car and when the top is raised and the bedding put in place, comfortable sleeping quarters will be had, the bed affording ample room for two people and the car top forming thorough protection in bad weather. It also has the function of a shelter at night.

For dressing or undressing in the car, I may remove the pivot pins of the hinges 17 and take off the forward extension so that the occupants of the car can use the forward seat as a dressing or undressing space.

The device is extremely compact and rigid in construction, it can be easily mounted on the car seats, the bedding may be kept under the seat cushions and supported out of sight during the day, and the frame of the bed may be packed and wrapped in a suitable covering and carried on the running board or in any other suitable place in the car.

The device may, of course, be made in various sizes according to the size of the car on which it is to be used and the details of construction may be modified in various ways and still be within the scope of my invention.

I claim as my invention:

1. An automobile bed comprising side rails adapted to rest upon the backs of the front and rear seats, cross bars secured to said side rails for holding them in parallel relation, slats removably mounted on said rails and forming a support for the bedding, legs having a pivotal connection with the middle portion of said rails and provided with means for rigidly securing them when the bed is set up, said legs bearing against the side walls of the car and resting at their lower ends upon the floor of the tonneau, whereby the bed will be braced against lateral movement on the seats, for the purpose specified.

2. An automobile bed comprising side rails adapted to rest upon the backs of the front and rear seats, cross bars detachably connected to said side rails, one of said cross bars being mounted to engage the robe rack on the front seat and be braced thereby, and legs mounted on said side rails to rest upon the bottom of the car.

3. An automobile bed comprising side rails adapted to rest upon the backs of the front and rear seats of the car, cross bars therefor, longitudinal extensions provided on the forward ends of said rails, and means for rigidly but detachably connecting them to said rails, slats mounted on said extensions and forming therewith supports for the feet when the bed is in use, said extensions normally overhanging the front seat and when removed exposing said seat for the driver's use.

4. An automobile bed comprising side rails adapted to rest upon the backs of the front and rear seats of the car, cross bars for said side rails, said bed having an extension mounted to overhang the front seat to form a support for the feet of the occupant of the bed, and said extension being movable to provide an unobstructed space on the front seat for the driver of the car, said bed having means for bracing it against the rear of the front seat and the side walls of the car, thereby adapting the bed for use when the car is running.

5. An automobile bed comprising side rails and cross bars between them, the end portions of said rails being adapted to rest upon the backs of the front and rear seats, supporting legs intermediate to said point of contact with the front and rear seats and means for pressing said side rails against the front seat for holding said bed in place when the car is in motion.

6. An automobile bed comprising side rails adapted to rest upon the backs of the front and rear seats, a cross bar connected at its ends to the middle portion of said rails, legs hinged to said cross bar and adapted to fold inwardly against said bar when the bed is taken apart, and said legs having projecting ends seated against the vertical faces of said side rails when the bed is set up and having means for temporarily securing them thereto, the lower ends of said legs resting upon the floor of the tonneau.

7. An automobile bed comprising side rails adapted to rest upon the backs of the front and rear seats, cross bars having their ends provided with hinge plate and removable pin connections with said rails, said cross bars having recesses and slats seated therein for supporting the bedding, and legs hinged on the middle portion of said side rails and adapted to swing downwardly to a vertical position and rest upon the tonneau floor.

In witness whereof, I have hereunto set my hand this 1st day of August 1916.

WILLIAM H. GROVERMAN.

Copies of this patent may be obtained for five cents each, by addressing the "Commissioner of Patents, Washington, D. C."